Figure 1:
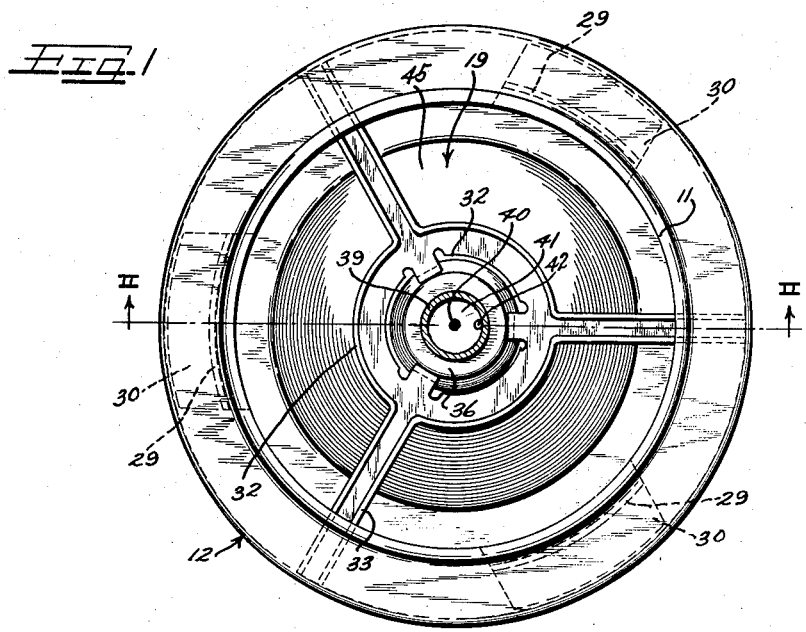

July 21, 1959     H. B. DRAPEAU     2,895,677

PRESSURE COMPENSATED WATERLINE THERMOSTAT

Filed Dec. 14, 1956

Inventor
HAROLD B. DRAPEAU

United States Patent Office 2,895,677
Patented July 21, 1959

2,895,677

PRESSURE COMPENSATED WATERLINE THERMOSTAT

Harold B. Drapeau, Oak Park, Ill., assignor to The Dole Valve Company, Chicago, Ill., a corporation of Illinois Application December 14, 1956, Serial No. 628,289

7 Claims. (Cl. 236—34)

This invention relates to thermostatically operated valves and more particularly relates to such valves as are adapted to control the temperature of the coolant of an internal combustion engine.

Heretofore, the temperature of the coolant of internal combustion engines has been controlled by thermal elements, operating valves of either the poppet or butterfly type, as the temperature of the coolant reaches the desired operating temperature of the engine. While such valves have been satisfactory and adequately control the engine temperature, the size of the valve including the thermal element required to operate the valve and the return spring for closing the valve against pump pressure becomes excessive where the valve is used to control the temperature of heavy duty industrial and commercial internal combustion engines having a high coolant flow capacity. This results in an excessively high cost and heavy thermostat.

Such thermostats also are inflexible and are not readily adapted to provide different temperature control patterns for high speed operation of the engine during various operating conditions. As for example, certain manufacturers consider it to be desirable to have the engine operating temperature increase with increases in engine speed, certain other manufacturers consider it to be desirable to have the engine temperature remain substantially constant with increases in engine speed, while still other manufacturers consider it to be desirable to have the engine temperature drop as the engine speed increases. Such different temperature control patterns of the thermostat are not possible with the present day thermostat except with an entire new design of thermostat for each operating condition.

A principal object of the invention, therefore, is to provide a thermostat having a high flow capacity for controlling the temperature of heavy duty internal combustion engines, of a far lighter weight and lower cost than the present thermostatic valves, heretofore used for these purposes.

A further object of the invention is to provide a high flow capacity thermostatic valve operating under heavy pump pressure in which the thermostat is so designed that the return spring need only be heavy enough to return the power member of the thermal element operating the valve, and thereby reducing the weight and cost of the thermostat over the weight and cost of previous thermostats used for controlling the temperature of heavy duty internal combustion engines.

A further object of the invention is to provide a high capacity type of thermostatic valve in which the cost of the valve is decreased by absorbing pump pressure.

A still further object of the invention is to provide a thermostatic valve for controlling the temperature of the coolant of heavy duty internal combustion engines in which the size of the thermal element required to open the valve is reduced, and the return spring for the thermal element need only be heavy enough to return the power member of the thermal element, and in which this is attained by providing means for counteracting the effect of pump pressure on the valve of the thermostat.

A still further object of the invention is to provide a thermostatic valve readily adaptable to attain different temperature control patterns for increased engine speeds by varying the degree of effectiveness of a force acting counter to the effect of pump pressure on the valve for the thermostat.

Figure 2:
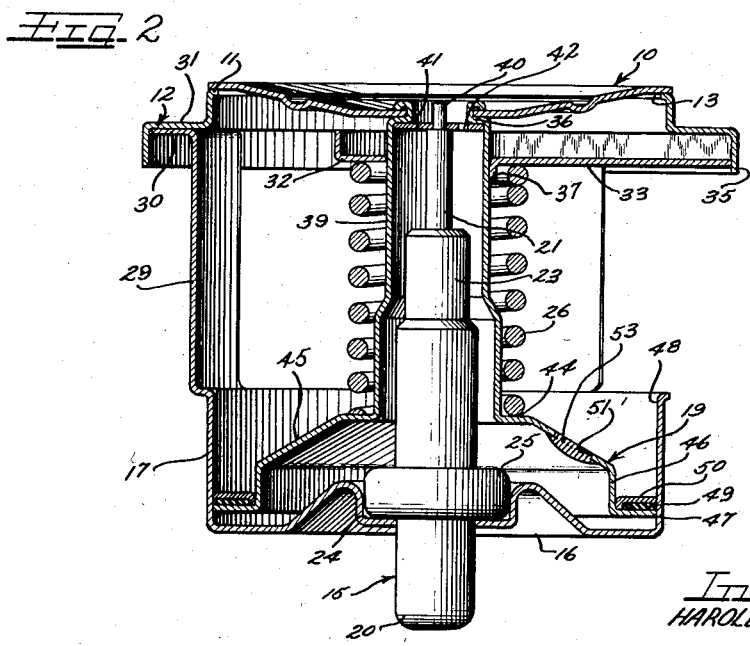

These and other objects of the invention will appear from time to time as the following specification proceeds and with reference to the accompanying drawings wherein:

Figure 1 is a top plan view of a thermostatic valve constructed in accordance with the invention, with the poppet valve removed; and Figure 2 is a horizontal sectional view looking substantially along line II—II of Figure 1, showing the poppet valve in a closed position.

In the embodiment of the invention illustrated in the drawing, I have shown a thermostatically operated poppet valve 10 engaging the outer side of an annular shouldered portion 11 of a housing 12, the inner margin of which shouldered portion defines a port 13. The housing 12 is adapted for sealing connection between the cylinder head (not shown) of an internal combustion engine and the hose fitting (not shown) leading from the water jacket of the engine, in a manner well known to those skilled in the art is not herein shown or described. The valve 10 is operated by a thermal element 15 seated in a bottom 16 of a cup-like guide 17 for a balancing disk or piston 19, connected with the valve 10 for movement therewith, as will hereinafter more clearly appear as the specification proceeds.

The thermal element 15 is of the so-called high motion or solid fill type of thermal element, having a casing 20 containing a fusible thermally expansible material, reacting against a flexible membrane (not shown) at the upper end of said casing, for extending a power member 21 from a cylinder 23 of the thermal element, upon fusion of the fusible material contained within the casing 20 at the operating range of the thermal element, as in the Vernet Patent No. 2,368,181, dated January 30, 1945.

The thermal element 15 is seated within a recessed seat 24 formed in an upwardly dished portion of the bottom 16 and engages the bottom of said seat on a clamping ring 25 for the thermal element, accommodating the casing 20 to extend through the bottom of the seat 24 in contact with the coolant in the water jacket of the engine. A return spring 26 is provided to maintain the clamping ring 25 into engagement with the bottom of the seat 24 and to retractibly move the power member 21 within the cylinder 23.

The guide 17 is generally cylindrical in form and is shown as having three circumferentially spaced arms 29 extending upwardly therefrom, having outturned upper end portions 30 engaging the bottom surface of an annular flanged portion 31 of the housing 12 and welded or otherwise secured thereto.

The return spring 26 is seated at its end adjacent the poppet valve 10 on the underside of an annular central portion 32 of a guide spider 33, extending inwardly from a flange 35 depending from the flanged portion 31 of the housing 12 and suitably secured thereto. The annular central portion 32 of the spider 33 has depending guide ears 37 having guiding engagement with a sleeve 39. The sleeve 39 encircles the cylinder 23 and power member 21 and has an inwardly extending annular shoulder 36 abutting the under surface of the poppet valve 10. The poppet valve 10 is secured to the shoulder 36 by the spinning of said shouldered portion upwardly along the inner margin of the poppet valve 10 and downwardly into engagement with the top thereof.

The power member 21 of the thermal element 15 has a reduced diameter upper end portion 40 extending through a disk 41 seated against the underside of the shouldered portion 36 of the sleeve 39. The disk 41 has a bleeder 42 therein.

The opposite end of the spring 26 from the spider 33 is seated on an outturned annular shoulder forming the lower margin of the sleeve 39 and terminating into a generally frusto-conical wall 45 of the balancing disk or piston 19. The frusto-conical wall 45 in turn terminates into a generally vertical annular wall 46 having a lower flange 47 extending outwardly therefrom into slidable engagement with an inner wall 48 of the cup-like retainer and guide 17. A seal 49 is provided to seal the flange 47 to the wall 48 and is retained to said flange as by an annular retainer 50.

The balancing disk 19 has a port 51 leading therethrough, closed by a fusible valve 53 herein shown as being a plug of low melting point metal such as solder and the like. The valve or plug 53 serves as a safety valve and melts upon failure of the thermal element 15, to accommodate fluid to pass through the port 51 to the underside of the balancing disk 19. The pressure on opposite sides of the balancing disk 19 is thereby substantially equalized and the pressure on the underside of the valve 10 will thus effect opening of the valve to accommodate the flow of coolant through the port 13, and thereby prevent damage to the engine upon over-temperature conditions caused by failure of the thermal element 15.

The balancing disk or valve 19, sealed to the wall of the retainer and guide 17 and subject to pump pressure on its outer face, is shown as having an effective pressure area which is substantially the same as the effective pressure area of the valve 10. With such a valve and balancing piston, where the balancing piston substantially balances the valve, the engine temperature at high speeds will remain substantially constant.

Where, however, it is desired that the engine temperature increases as the speed of the engine increases, it is only necessary to overbalance the poppet valve 10 by increasing the effective area of the balancing piston 19 to the extent necessary to overbalance the poppet valve 10. On the other hand, a temperature drop with increases in engine speed may be attained by reducing the effective area of the balancing disk so that the effective area of the poppet valve 10 subject to pump pressure is greater than the effective area of the balancing disk or piston 19.

It may be seen from the foregoing that the balancing disk or piston 19 serves to counteract the effect of pump pressure on the valve, and thus subtsantially reduces the size of return spring required to close the poppet valve 10 against pump pressure. This being the case, the power required to open the valve against the return spring has been greatly reduced, making it possible to use a far smaller thermal element to open the valve than formerly, which besides materially reducing the weight and cost of the valve also makes it far easier to seal the power member of the thermal element against leakage and thereby prevents water lock underneath the power member of the thermal element.

It may still further be seen that the fusible valve 53 serves as a safety valve to protect the engine from damage upon failure of the thermal element as by loss of the thermally expansible material therein, and effects opening of the poppet valve 10 by pressure upon over-temperature conditions sufficient to melt said valve. It should here be understood that this safety feature has not heretofore been possible, since the return spring used in former thermostatic valves was necessarily designed so as not to be overcome by pump pressure.

It should here be understood that with large sizes of thermal elements, special sealing provisions are required to offset the larger clearance volume between the outside diameter of the piston and the inside diameter of the guide cylinder therefor, and that even with these special sealing provisions waterlock of the piston of the thermal element may occur. With the smaller sizes of thermal elements special sealing is not necessary with the result that such thermal elements are inherently free from water lock.

It will be understood that modifications and variations in the present invention may be effected without departing from the spirit and scope of the novel concepts thereof, except as limited by the scope of the claims appended hereto.

I claim as my invention:

1. In a thermostatic valve for controlling the engine temperatures of internal combustion engines and the like, a valve housing having a port therein for the flow of coolant therethrough and having a guide spaced from said port, a poppet valve engageable with said port along the downstream side thereof, a thermal element seated within said guide and having a power member extensible upon predetermined increases in temperature, for opening said valve, a sleeve connected with said valve and extending from said valve toward said guide in encircling relation with respect to said thermal element, and a balancing disconnected with said sleeve and guided in said guide and absorbing pump pressure on said valve.

2. In a thermostatic valve for controlling the engine temperatures of internal combustion engines and the like, an annular valve housing having a port leading therethrough, a generally cylindrical guide spaced from said port and secured to said housing and having a bottom having a thermal element seated therein having a casing on the outside of said bottom in the direct path of the flow of coolant, a poppet valve engageable with the opposite side of said housing from said guide about the margin of said port and controlling the flow of coolant through said port, said thermal element having a power member extensible upon increases in temperature of the coolant to the operating range of the thermal element and having connection with said valve for opening said valve, a sleeve connected with said valve at one end and encircling said power member, a return spring seated on said housing and sleeve for returning said power member and closing said valve upon predetermined reductions in temperature of the coolant, and a balancing disk guided by the cylindrical wall of said housing and connected with said sleeve for absorbing pump pressure on said valve.

3. In a thermostatic valve for controlling the temperature of internal combustion engines and the like, an annular valve housing having a port leading therethrough, a guide spaced from said housing in an upstream direction and supported by said housing, said guide having a generally cylindrical wall and a bottom having a thermal element seated therein, a poppet valve engageable with the opposite side of said housing from said guide about the margin of said port and controlling the flow of coolant therethrough, said thermal element including a casing seated in said bottom of said guide and extending therethrough in the path of the flow of coolant, a cylinder extending from said casing toward said valve and a power member guided in said cylinder and having operative connection with said valve, a spider extending across said housing adjacent said port, a sleeve having connection at one end with said valve and extending therefrom and encircling said power member and cylinder of said thermal element and slidably guided in said spider, a spring seated at one end on said spider and encircling said sleeve and seated at its opposite end on said sleeve for retractibly moving said power member and closing said valve, and a balancing disk balancing pump pressure on the valve and connected with said sleeve, and guided for movement along the wall of said spider.

4. In a thermostatic valve for controlling the temperature of internal combustion engines and the like, an annular valve housing having a port leading therethrough, a guide spaced from said housing in an upstream direction and supported by said housing, said guide having a generally cylindrical wall and a bottom having a thermal element seated therein, a poppet valve engageable with the opposite side of said housing from said guide about the margin of said port and controlling the flow of coolant therethrough, said thermal element including a casing seated in said bottom of said guide and extending therethrough in the path of the flow of coolant, a cylinder extending from said casing toward said valve and a power member guided in said cylinder and having operative connection with said valve, a spider extending across said housing adjacent said port, a sleeve having connection at one end with said valve and extending therefrom and encircling said power member and cylinder of said thermal element and slidably guided in said spider, a spring seated at one end on said spider and encircling said sleeve and seated at its opposite end on said sleeve for retractibly moving said power member and closing said valve, a balancing disk connected with the opposite end of said sleeve from said valve and having engagement with the cylindrical wall of said guide, and sealing means sealing said balancing disk to said guide to balance pump pressure on said valve.

5. In a thermostatic valve particularly adapted for controlling the engine temperature of internal combustion engines and the like, a valve housing having a port leading therethrough, a poppet valve cooperable with said port for controlling the flow of coolant through said port, a thermal element seated in said housing for operating said valve to admit coolant through said port, valve balancing means tending to balance pump pressure on the valve, and temperature responsive valve means opening upon over-temperature conditions and counteracting said valve balancing means and effecting the opening of said poppet valve by the pressure of fluid thereon.

6. In a thermostatic valve for controlling the engine temperatures of internal combustion engines and the like, an annular valve housing having a port leading therethrough, a generally cylindrical guide spaced from said port and secured to said housing and having a bottom having a thermal element seated therein having a casing on the outside of said bottom in the direct path of the flow of coolant, a poppet valve engageable with the opposite side of said housing from said guide about the margin of said port and controlling the flow of coolant through said port, said thermal element having a power member extensible upon increases in temperature of the coolant to the operating range of the thermal element and having connection with said valve for opening said valve, a sleeve connected with said valve at one end and encircling said power member, a return spring seated on said housing and sleeve for returning said power member and closing said valve upon predetermined reductions in temperature of the coolant, a balancing disk guided by the cylindrical wall of said guide and connected with said sleeve and tending to balance pump pressure on said valve, and fusible valve means opening upon over-temperature conditions and counteracting said valve balancing means and effecting the opening of said poppet valve by the pressure of fluid thereon.

7. In a thermostatic valve for controlling the engine temperatures of internal combustion engines and the like, a valve housing having a port therein for the flow of coolant therethrough and having a cylindrical guide member spaced from said port in an upstream direction, said guide member at the farther end from said port having a closed end having a central opening therethrough, a poppet valve engageable with said port on the downstream side thereof, a thermally responsive element seated in said closed end of said guide member and closing the opening therethrough and having a sensing portion projecting in an upstream direction through said opening and having a power member extensible upon predetermined increases in temperature and operatively connected to said valve, a balancing member rigidly connected to said valve and guided by said cylindrical guide member and forming therewith a chamber continuously sealed against coolant pressure upstream of said port, and means for continuously subjecting said chamber to coolant pressure downstream of said port.

References Cited in the file of this patent

UNITED STATES PATENTS

| | | |
|---|---|---|
| 1,237,335 | Hennebohle | Aug. 21, 1917 |
| 2,408,269 | Peterson | Sept. 24, 1946 |
| 2,417,708 | Shaw | Mar. 18, 1947 |
| 2,516,996 | Jensen | Aug. 1, 1950 |
| 2,770,440 | Woods | Nov. 13, 1956 |

FOREIGN PATENTS

| | | |
|---|---|---|
| 1,070,788 | France | Feb. 24, 1954 |
| 474,525 | Germany | Apr. 6, 1929 |

UNITED STATES PATENT OFFICE

CERTIFICATE OF CORRECTION

Patent No. 2,895,677 July 21, 1959

Harold B. Drapeau

It is hereby certified that error appears in the printed specification of the above numbered patent requiring correction and that the said Letters Patent should read as corrected below.

Column 4, line 24, for "disconnected" read -- disk connected --.

Signed and sealed this 9th day of February 1960.

(SEAL)
Attest:
KARL H. AXLINE
Attesting Officer

ROBERT C. WATSON
Commissioner of Patents